United States Patent
Subramanian et al.

(10) Patent No.: US 10,235,248 B1
(45) Date of Patent: Mar. 19, 2019

(54) PROCESSING I/O OPERATIONS IN PARALLEL WHILE MAINTAINING READ/WRITE CONSISTENCY USING RANGE AND PRIORITY QUEUES IN A DATA PROTECTION SYSTEM

(71) Applicant: EMC IP Holding Company LLC, Hopkinton, MA (US)

(72) Inventors: Balaji Subramanian, Fremont, CA (US); Yamini Allu, Sunnyvale, CA (US); Srisailendra Yallapragada, Cupertino, CA (US); Sirisha Kaipa, Cupertino, CA (US); Vrushali Kulkarni, Sunnyvale, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 169 days.

(21) Appl. No.: 15/498,841

(22) Filed: Apr. 27, 2017

(51) Int. Cl.
*G06F 17/30* (2006.01)
*G06F 11/14* (2006.01)

(52) U.S. Cl.
CPC ...... *G06F 11/1453* (2013.01); *G06F 11/1469* (2013.01); *G06F 17/30156* (2013.01); *G06F 17/30194* (2013.01); *G06F 2201/80* (2013.01); *G06F 2201/82* (2013.01)

(58) Field of Classification Search
CPC ...................... G06F 17/30156; G06F 17/30194
See application file for complete search history.

(56) References Cited

U.S. PATENT DOCUMENTS

| | | | | |
|---|---|---|---|---|
| 4,509,119 A | * | 4/1985 | Gumaer | G06F 9/44 707/E17.001 |
| 6,480,904 B1 | * | 11/2002 | Kato | G06F 3/0611 710/45 |
| 2012/0042115 A1 | * | 2/2012 | Young | G06F 11/2076 711/6 |
| 2014/0189209 A1 | * | 7/2014 | Sinclair | G06F 12/0246 711/103 |
| 2015/0234612 A1 | * | 8/2015 | Himelstein | G06F 13/00 714/6.21 |
| 2016/0202909 A1 | * | 7/2016 | Nguyen Tien | G06F 3/061 711/103 |

* cited by examiner

*Primary Examiner* — Kris E Mackes
(74) *Attorney, Agent, or Firm* — Workman Nydegger

(57) ABSTRACT

In one example, a method includes receiving a stream that identifies I/O operations requested to be performed with respect to a data grouping, and identifying, in the stream, random I/O requests and sequential I/O requests. Next, the stream is split into an incoming queue containing the sequential I/O requests and a priority/processing queue containing the random I/O requests. A metadata load queue is then defined by assigning each of the random I/O requests to a respective range of metadata. The metadata of each range is loaded, and the random I/O requests re-queued. Using the loaded metadata, a random I/O operation is performed that corresponds to one of the random I/O requests. Finally, the random I/O operation and a sequential I/O operation are performed concurrently with each other.

20 Claims, 9 Drawing Sheets

PROCESSING I/O OPERATIONS IN PARALLEL WHILE MAINTAINING READ/WRITE CONSISTENCY USING RANGE AND PRIORITY QUEUES IN A DATA PROTECTION SYSTEM

FIELD OF THE INVENTION

Embodiments of the present invention generally concern implementation and management of random and sequential input/output (I/O) processes in a data protection system. More particularly, at least some embodiments of the invention relate to systems, hardware, computer-readable media, and methods directed to the performance of random I/O operations in various backup systems and processes.

BACKGROUND

Entities typically generate and use data that is important in some way to their operations. This data can include, for example, business data, financial data, and personnel data. Accordingly, entities typically back up their important data so as to create a backup that can later be used in a data restore process if necessary.

The data protection systems used to back up data may be able to support relatively large backup files, whose size may be measured in 100s of GB. These backup files are often read/written in a sequential manner. Within the context of a particular backup file, input and output (I/O) operations are considered to take the form of a stream, due to the sequential manner in which the I/O operations are performed.

In order to support the use of sequential I/O operations, backup systems may allocate resources on a per-backup stream basis, and the I/Os for each backup stream are processed serially by the backup system in order to maintain read/write consistency of the stream and associated file. While such serial processing has proven to be effective in certain circumstances, there are also circumstances where reliance on serial processing can be problematic.

By way of example, as data protection (DP) methods and systems evolve to support an expanding variety of use cases, a need has arisen for implementation of not only serial I/O operations, but also random I/O operations, in connection with data backup and restore processes. However, typical DP methods and systems have failed to adequately address this emerging need.

Thus, what is needed are systems and methods to address and improve performance of excessive file/dedupe metadata access. It would also be useful to be able to maintain read/write consistency in a backup system, while also improving the performance of the system without the need to make changes in the client application behavior. Finally, it would be useful to be able to improve the random I/O performance without adversely affecting the performance of sequential I/O.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
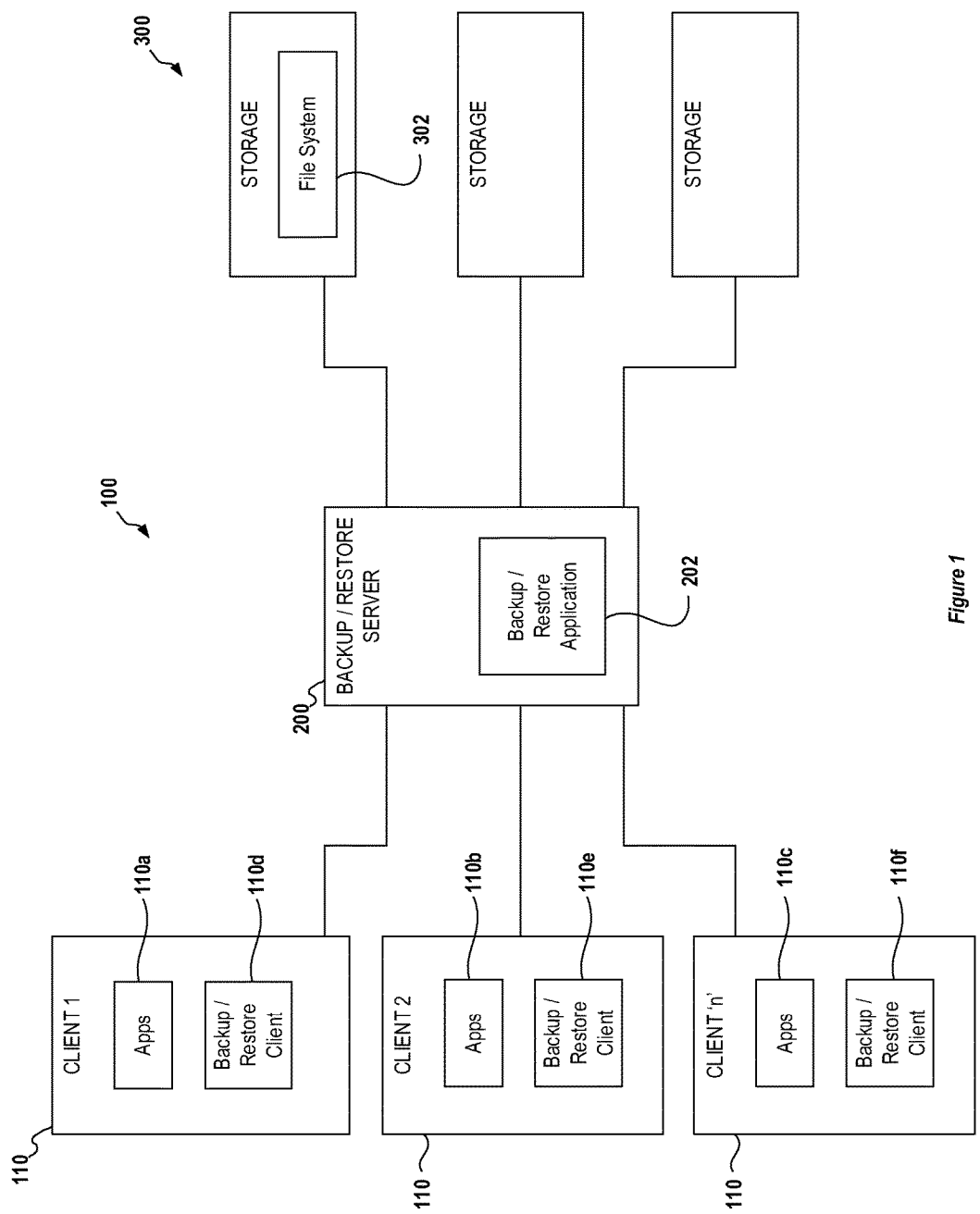
FIG. 1 discloses aspects of an example operating environment for at least some embodiments.

Embodiments of the present invention generally concern management of metadata processes in a distributed file system. More particularly, at least some embodiments of the invention relate to systems, hardware, computer-readable media, and methods directed to implementation and/or improvement of random I/O read and write processes in a data backup and restore environment.

Embodiments of the invention can be employed in a variety of data storage environments, examples of which include, but are not limited to, cloud storage environments, public/private clouds, and/or on-premises storage environments, for example. The scope of the invention is not limited to any particular storage environment however. Client data that is to be backed up and/or restored may be distributed across one or more storage environments and/or across different portions of a single storage environment. The storage can take any form, examples of which are disclosed elsewhere herein, such as SSD, and can be employed in any combination. As well, embodiments of the invention may be employed in conjunction with backup and/or restore processes and associated applications, including backup and restore applications and associated backup and restore clients. These, and/or other backup and restore applications and clients may comprise, or consist of, data deduplication functions and processes and, as such, embodiments of the invention can be employed in connection with data deduplication processes and associated data deduplication file systems (FS).

In more detail, some example embodiments may be concerned with addressing and improving performance of excessive file/deduplication metadata accesses. For example, some example embodiments implement a method of combining range-based I/O ordering with priority queues for efficient processing of random I/O operations within a data protection system. Such embodiments are not limited to use with any particular data protection system, storage environment, or filesystem, but at least some embodiments may be particularly useful in connection with the EMC Corp. Data Domain filesystem (DDFS). In this particular example use environment, a DDFS process is the main process responsible for the operation of the DDOS (Data Domain Operating System) de-duplication filesystem. The following discussion illustrates some example circumstances where example embodiments may prove useful, although no embodiment or group of embodiments is required to implement any of the specified functionalities nor be used in connection with the illustrative circumstances.

In particular, consider for example that metadata accesses for every file (metadata segments) and system metadata (Index) are relatively higher for large deduplication data protection systems than for a relatively smaller deduplication data protection system. A single data segment access requires accessing both file and system metadata access. When I/Os are sequential, metadata is created, or could be pre-fetched, and they incur fewer disk I/Os because of good spatial locality on the disk. However, random read/write workloads typically overwrite or read from existing files and the I/O size is also smaller compared to traditional backup workloads. Thus, pre-fetches and read-aheads may not work well, or at all, for these workloads since the file access is random. To overwrite or to do a random read, the filesystem must first load and read the existing metadata segment. Loading the metadata segment would incur latency on the read/write path and if the filesystem needs to support more user I/Os, the filesystem bottleneck would involve loading the disk subsystem from the disk. Thus, one approach would be to cache all the metadata segments in a solid state disk (SSD). The metadata load could be on the order of milliseconds even if metadata is cached in SSD. Also, if the backup files are large and/or if the system doesn't have enough SSD storage, metadata load could still be a problem.

The aforementioned and/or other embodiments of the invention may be concerned as well with maintaining read/write consistency while also providing for a relative improvement in the performance of the system. As discussed below, a variety of considerations may be accounted for by such embodiments, although no embodiment or group of embodiments is required to implement any of the specified functionalities nor be used in connection with any of the illustrative circumstances.

For example, one such constraint or consideration is that read/write consistency cannot be compromised for parallelism. This is because backup applications have come to depend on DP systems for data consistency and are not built similar to primary storage applications that may have built-in data consistency. Hence, it can be important to maintain the read/write order while providing parallelism in the I/O processing of read and write requests. As well, data protection systems should adapt to the newer backup clients in servicing multiple requests without compromising the consistency. Further, client applications and existing filesystem (application program interfaces) APIs should not be required to be changed substantially in order to accommodate parallel processing within filesystems. For example, any changes to improve I/O performance should not require substantial changes in client behavior, require substantial changes in existing APIs, or break any assumptions that are being maintained with the existing client. Finally, parallelism in I/O processing for those applications and/or processes that require it should not be implemented at the expense of user inconvenience, nor should necessitate any substantial changes on the part of the client in connection with which read and/or write processes are performed.

Finally, the aforementioned and/or other embodiments of the invention may be concerned as well with implementing a relative improvement of random I/O performance without adversely impacting sequential I/O performance in the same environment. The following discussion illustrates some example circumstances where such embodiments may prove useful, although no embodiment or group of embodiments is required to implement any of the specified functionalities nor be used in connection with the illustrative circumstances.

In particular, many data protection systems are primarily optimized for the use of sequential I/O processes. In these systems, sequential performance of I/O processes is still a requirement, although such systems may also employ random I/O processes as well. Accordingly, embodiments of the invention may, in such systems, provide for a relative improvement in random I/O performance without adversely affecting the performance of sequential I/O processes.

A. Example Operating Environments

In general, and also discussed above, embodiments of the invention may include and/or be implemented in a data protection system operating environment that includes one or more storage systems or storage environments, various client systems and devices that generate data and perform, and/or request performance of, I/O operations with respect to backed up data. Such I/O operations can be performed in connection with one or more data backup and/or data restore processes. Thus, I/O processes such as are disclosed herein may be performed by a backup and restore application, which can be hosted on a server, that communicates directly or indirectly with one or more clients that generate and transmit read and write requests, although other applications could alternatively be employed. The backup and restore application may also communicate, directly or indirectly, with storage and/or storage servers in order to service client read and write requests directed to the storage and/or storage servers.

A storage environment can take the form of a cloud storage environment, an on-premises storage environment, and hybrid storage environments that include public and private elements, although the scope of the invention extends to any other type of storage environment as well. More generally, embodiments of the invention can be implemented in any suitable environment and the scope of the invention is not limited to the example environments disclosed herein.

Any of the devices, including the clients, in the operating environment can be physical machines or virtual machines (VM), though neither type of machine is required for any embodiment. Similarly, data protection system components such as databases, storage servers, backup servers, and restore servers, for example, can likewise take the form of physical machines or virtual machines (VM), though neither type of machine is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Some example embodiments of the invention will be described with reference to a data storage system in the form of a storage system configured to store files, but it should be understood that the principles of the disclosure are not limited to this configuration. Rather, they are applicable to any system capable of storing and handling various types of objects, in analog, digital, or other form. Although terms such as document, file, or object may be used by way of example, the principles of the disclosure are not limited to any particular form of representing and storing data or other information. Rather, such principles are equally applicable to any object capable of representing information.

With reference now to FIG. 1, an example system 100 is disclosed that includes one or more clients 110, each of which can be any general purpose computing device, one example of which is discussed in FIG. 2 below. For example, one or more of the clients 110 may be a personal computer, workstation, handheld computer, smart phone, and/or tablet computer. The clients 110 may include applications 110a, 110b and 110c that generate, and/or cause the generation of, data that is desired to be backed, and later restored if necessary to the clients 110. To this end, the clients 110 may each include an instance of a backup/restore client 110d, 110e and 110f that cooperates with a backup/restore application, discussed below, to backup and restore data generated by one or more of the applications 110a-c.

The clients 110 may be in communication with a backup and restore server 200 over a network connection, such as a local area network ("LAN") or wide area network ("WAN"), or via any other form of communication or network. The clients 110 may interact with the backup and restore server 200 when there is a need to backup and/or restore client 110 data. Thus, the backup and restore server may host a backup and restore application 202 that cooperates with one or more of the backup/restore clients 110d-f to back up and/or restore client 110 data. The backup/restore processes can include read and write requests, examples of which are disclosed herein. In some cases, the backup/restore clients 110d-f can perform, or cause the performance of, data deduplication before, or as part of, a client 110 data backup process.

The backup and restore server 200 may communicate with storage 300, over any suitable network connection or other connection, to backup client 110 data to storage 300, and restore client 110 data from storage 300 to a client 110, based on client 110 read and/or write requests transmitted to the backup and restore server 200, and acted upon by the backup/restore application 202. More specifically, such client 110 read and write requests may be processed by the backup/restore application 202 using any of the methods and processes disclosed herein. In some embodiments the backup/restore application 202 may perform data deduplication before, or as part of, a process that backs up client 110 data. The storage 300 may include one or more instances of a filesystem 302 that catalogues files and other data residing in the storage 300.

The storage 300 can include any type or types of storage, examples of which include, but are not limited to, disk storage, SSD storage, and/or any other type of storage disclosed herein. In some cases, storage 300 can include a combination of magnetic and/or optical disk storage, and SSD storage, although no particular type of storage, or combination of storage types, is required by any embodiment of the invention. As well, the storage 300 can comprise, or consist of, one or more database servers.

Finally, the backup and restore server 200 and storage 300 may collectively comprise part, or all of, a data protection system. Such a data protection system can include additional elements as well. One example of such a data protection system is the EMC Corp. Data Domain system, although the scope of the invention is not limited to that example. Correspondingly, the filesystem 302 may, in some embodiments, take the form of a Data Domain Filesystem (DDFS), although that is not required.

B. Example Host Configuration

Figure 2:
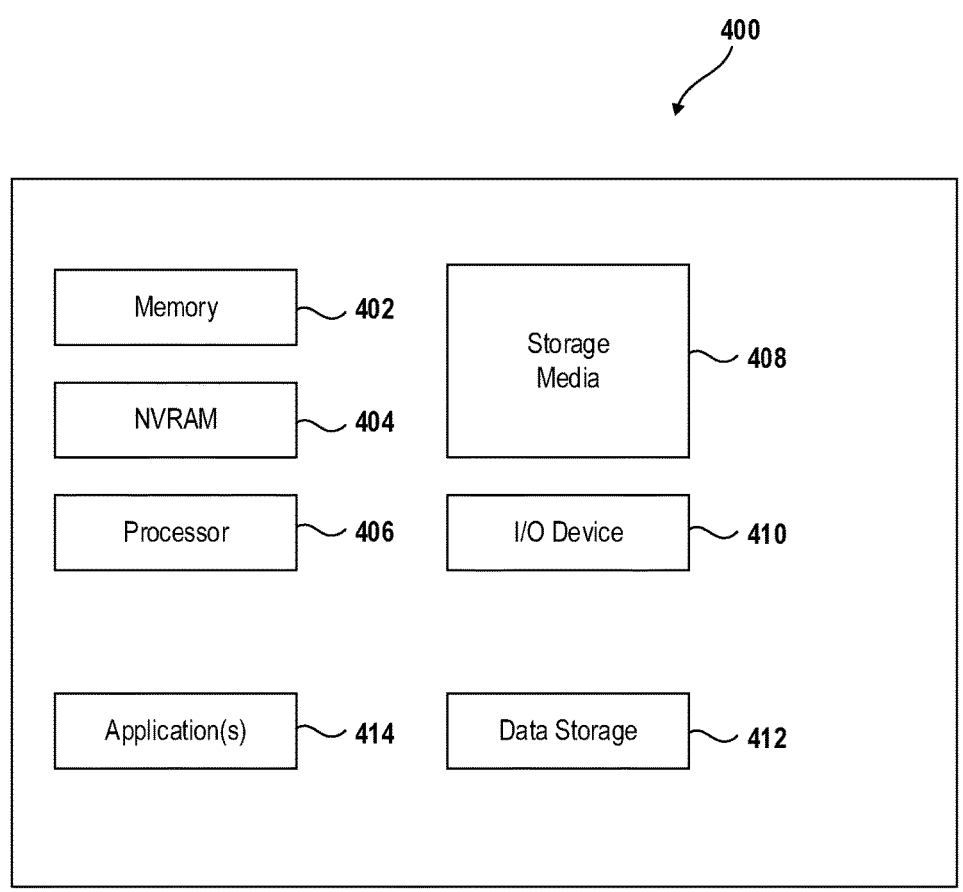
FIG. 2 discloses aspects of an example host configuration.

With reference briefly to FIG. 2, one or more of the clients 110, backup and restore server 200, and storage 300 can take the form of a physical computing device, one example of which is denoted at 400. In the example of FIG. 2, the physical computing device 400 includes a memory 402 which can include one, some, or all, of random access memory (RAM), non-volatile random access memory (NVRAM) 404, read-only memory (ROM), and persistent memory, one or more hardware processors 406, non-transitory storage media 408, I/O device 410, and data storage 412. One or more of the memory components of the physical computing device can take the form of solid state device (SSD) storage. As well, one or more applications 414 are provided that comprise executable instructions. Such executable instructions can take the form, for example, of a backup/restore application 202 for example.

C. Example Data Format Configurations

Figure 3:
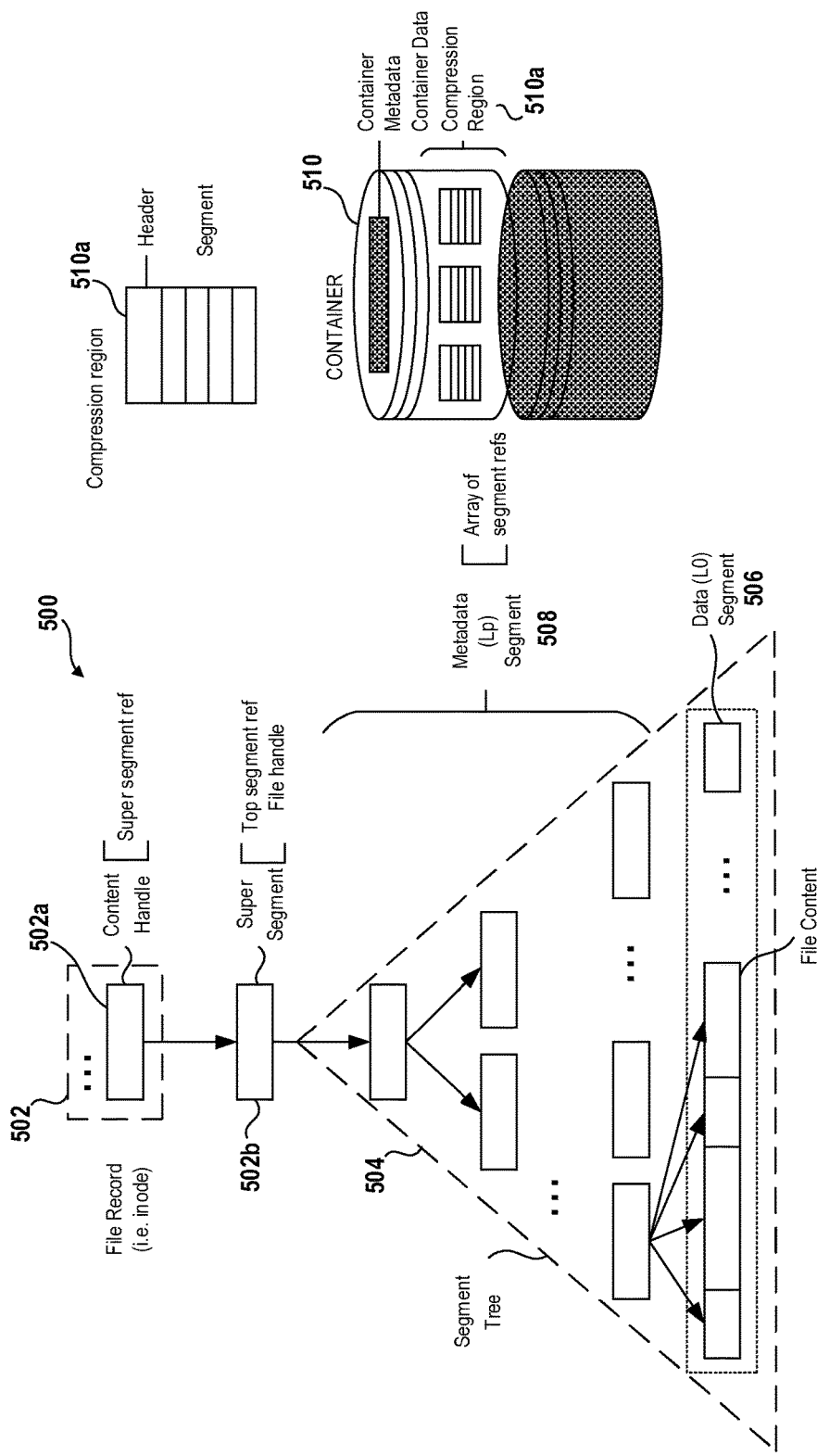
FIG. 3 discloses aspects of example data and metadata storage configurations.
Figure 4:
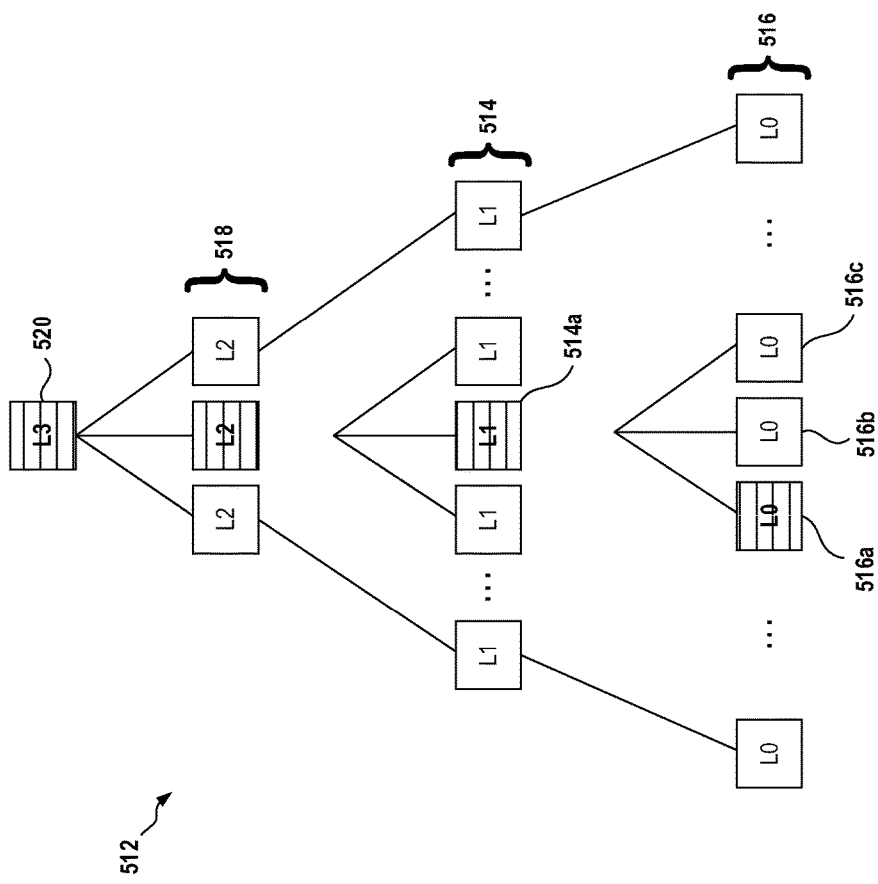
FIG. 4 discloses further aspects of example data and metadata storage configurations.

With continued reference to FIG. 1, and directing attention now to FIGS. 3 and 4, details are provided concerning an example architecture 500 for representing and formatting data such that the data can be stored and/or retrieved using parallel streams. The example architecture 500 also supports both sequential and random I/O requests.

In particular, and as shown in FIG. 3, a file 502, or file record, in a filesystem, one example of which is the DDFS filesystem, is represented as a tree 504 of segments. While the example of FIG. 3 illustrates the case of a group of data that takes the form of a file, the scope of the invention is not so limited. In other embodiments, the data grouping can take any other form and/or size. As further indicated, the file 502 can include a content handle 502a that may refer to a super segment 502b that is a top segment of the file 502 and is referenced by, or otherwise associated with, the content handle 502a.

The data, such as file 502 for example, that is written to the filesystem is segmented into $L_0$ data segments 506, or simply, segments. Each data segment is fingerprinted, such as by a hashing process for example, to generate a unique reference, that is, metadata, that corresponds to that segment. The $L_0$ references, or metadata, corresponding to data segments that fall within a given data range are stored in a higher-level $L_p$ segment 508. Thus, the $L_p$ segment 508 is an array of $L_0$ references and corresponds to one or more $L_0$ data segments that are within the given data range. By identifying particular data segments using this referential relationship, the $L_0$ references, such as $L_p$ segment 508 for example, can be used to enable reading and/or writing of data in response to an I/O request.

The size and extent of the data range can be arbitrary, may be specified by an application such as a backup and restore application, or can be specified by a user such as an administrator. Additionally, or alternatively, the size and extent of the data range can be a function of variables including, but not limited to, the size of the file 502. It can thus also be seen that one or more attributes of the $L_p$ segment may be a function of one or more aspects of the given data range.

With continued reference to FIG. 3 in particular, the filesystem packs the unique segments of the file 502 into compression regions 510a within on-disk containers 510, where the $L_0$ references for the segments are stored as container metadata. In some embodiments at least, the unique segments are arranged in the compression regions 510a in the order of segment offsets within the file 502, although arrangements in the on-disk container 510 can be performed with respect to additional or alternative $L_0$ segment attributes.

In some example embodiments, when data is read/written sequentially, the example layout disclosed in FIGS. 3 and 4 can reduce the processing overhead by one index lookup and one metadata region read for every 4.5 MB worth of compressed data. Thus, significant savings in processing overhead, and corresponding improvements in IOPS and latency, may be realized by embodiments of the invention. Such savings can be realized not only in sequential read/write processes, but also in random read/write processes.

For example, and with continued reference to the illustrative configuration of FIGS. 3 and 4, a random read process may, on average, require 8 disk I/Os internally. On the other hand, and as explained in more detail below, reading an $L_0$ data segment from a filesystem using the arrangement of FIGS. 3 and 4 would require only 4 disk I/Os, namely, 2 index lookups, 1 container metaload, and 1 compression region.

In a filesystem according to the present invention, such as a DDFS filesystem for example, and with particular reference now to the $L_p$ tree 512 of FIG. 4, which may, but need not, be similar, or identical, to the $L_p$ tree 504, a random read process must traverse the $L_p$ tree 512 until the $L_p$ metadata is located that corresponds with the data of the I/O request. If it is assumed that most upper levels of the Lp tree 512 are cached, such as $L_2$ and $L_3$ for example, disk I/O access is needed for loading the $L_1$ metadata 514 and $L_0$ data segments 516. As I/Os within a stream are processed serially, the latency for random I/O requests is dependent on the number of pending I/Os, which can be relatively large.

It should be noted here that the $L_2$ metadata 518 and $L_3$ metadata 520 may be similar to the $L_1$ metadata 514, at least in the sense that, for example, each $L_2$ can take the form of an array of references to $L_1$ metadata 514, and each $L_2$ can embrace a range, or other grouping, of $L_1$ metadata 514. Similar considerations apply to $L_3$ which, in the example of FIG. 4, may constitute a super segment 520 of a file or other data collection. As will be appreciated from this discussion, there is no limit to the size or scope of an $L_p$ tree such as the $L_p$ trees 504 and 512, nor is the scope of the invention limited to any particular size or scope of an $L_p$ tree.

With continued reference to the examples of FIGS. 3 and 4, a 100 GB backup file stored in a filesystem, such as DDFS for example, might have a single $L_3$ segment, 50 $L_2$ segments and 25K $L_1$ segments. The $L_2$ and higher order segments, for example, may be cached in memory since they are few in number relative to the $L_0$ data segments, and may not change frequently. Correspondingly, it may not be possible or practical in some cases to cache all the $L_1$ and $L_0$ segments for a file in memory because one or both of those segment types may be quite numerous, particularly in the case of a relatively large file such as the 100 GB example noted above. Because both the $L_1$ and $L_0$ segments for a file may be stored on disk, rather than cached, the cost, in terms of processing overhead, of reading data segments $L_0$ would include loading the associated $L_1$ segment(s) from the disk as well. Also, if the random I/O request region crosses one or more data segment $L_0$ boundaries, for example, the associated I/O request would require loading of two $L_1$ segments, which could increase the I/O latency further.

Directing continued attention to FIGS. 3 and 4, at least some example embodiments of the invention involve the use of separate respective I/O paths for sequential and random I/O requests within the file system, in order to avoid performance regression for sequential I/Os. As noted earlier, with random I/Os, the metadata required to process the I/O may not be in memory and will require disk I/Os.

D. Operational Aspects of Some Example Embodiments

In general, example embodiments of the invention can be employed with both random and sequential I/O requests. A random request means that, in the case of a read operation for a file for example, the various data segments or parts that make up the file may be read out from storage in any order. On the other hand, a sequential request means signifies that, in the case of a read operation for a file for example, the various data segments or parts that make up the file are read out from storage in sequence. Accessing and writing data sequentially is typically faster than accessing and writing data randomly. However, and as noted earlier herein, needs have evolved and random I/O processes are required to be employed in some cases.

In operation, the tree 504/512 structure of FIGS. 3 and 4 enables, for example, the loading of metadata in response to an I/O request to be sped up. In these illustrative examples, an $L_1$ segment is used as the range. For example, the $L_1$ segment 514a refers to a range that comprises, or consists of, $L_0$ data segments 516a, 516b and 516c.

Advantageously, I/O requests which are not dependent on the same $L_1$ segment can be processed independently of each other, in any order, and possibly simultaneously with each other. On the other hand, I/O requests which are dependent on the same $L_1$ segment, will be processed serially in the order of receipt. In this way, multiple I/O requests can, in some cases at least, be processed in parallel, thereby maintaining the read/write consistency. That is, for example, I/O requests which are dependent on different respective $L_1$ segments can be processed at the same time without introducing read/write consistency problems, since each of the $L_1$ segments embraces different respective data segments $L_0$.

Moreover, the use of ranges reduces the amount of disk search time that is required for a random I/O request, since the exact location of a particular data segment need not be known. Instead, it is only necessary to know which range that data segment falls in, and then the corresponding $L_1$ segment can be accessed. By issuing $L_p$ loads in parallel for requests that are not dependent on each other, the IOPS is improved, and latency of the I/O operations reduced.

Note that as used herein, latency refers to the time needed to complete a requested I/O task. This time, or latency, will vary depending upon various considerations, such as whether or not the requested task is a random read/write task, or a sequential read/write task. For example, as between a random read and a sequential read, for the same grouping of data, the latency will be relatively longer for the random read since more time is needed to locate the data segments that are to be returned in response to the read request.

In more detail, I/O operations within a particular file or other data grouping are considered to define a corresponding stream associated with that particular file. Thus, the filesystem may internally employ a job queue for each stream for processing the I/O request(s) that define the stream. That is, respective job queues can be employed for each of a plurality of metadata segments $L_p$. When the processing of a read/write request requires loading one or more metadata segments $L_p$, which may be primarily $L_1$ metadata segments in some embodiments, from the disk subsystem, the request is added to a list or queue of pending load jobs in the tree corresponding to the $L_1$ metadata segment. The filesystem can continue processing the next request in the job queue for the $L_1$ metadata segment.

In order to avoid re-enqueing older jobs behind commit of stream, the job queue for the stream is split into two parts. The first part is an incoming queue (see, e.g., reference 600 in FIGS. 5a and 5b) where each read/write request is de-queued and serially processed. That is, any non-random read/write requests in the incoming queue may be processed sequentially, and without any need to load metadata segments or ranges. Thus, sequential I/Os, commit on stream, and other I/Os are some examples of requests that are processed in this incoming queue.

The second part of the job queue for the stream is a processing queue (see, e.g., reference 650 in FIG. 5b) in which random read/write requests that were earlier queued for pending $L_p$ load, as discussed below, will be enqueued for completion. This processing queue is a priority queue and if there are any requests in the processing queue, the filesystem will process those requests before processing requests in the incoming queue. When the $L_p$ load is completed, all requests in the $L_1$ range queue are queued back in the same order to the priority queue in the job queues associated with the stream, thereby maintaining read/write consistency.

Thus, using two separate queues for request processing within a single common stream may provide various advantages. For example, operations such as sequential I/Os, commit on stream, and all other file operations (examples of which include set_size, get_size, set_info, get_info) are processed in the incoming queue, such that performance regression for sequential I/Os is avoided. As another example, adding the I/O request to the processing/priority queue will not starve the I/O request that is waiting in the incoming queue for its $L_p$ load to be processed behind that incoming I/O request. In this way, the I/O latency may be reduced. Moreover, sequential requests can be performed concurrently with random requests in the processing/priority queue, with the result that the stream as a whole is processed more quickly and efficiently. For writes which are being done as appends to existing file, no latency is incurred to load the metadata since metadata is created for these writes.

Figure 5A:
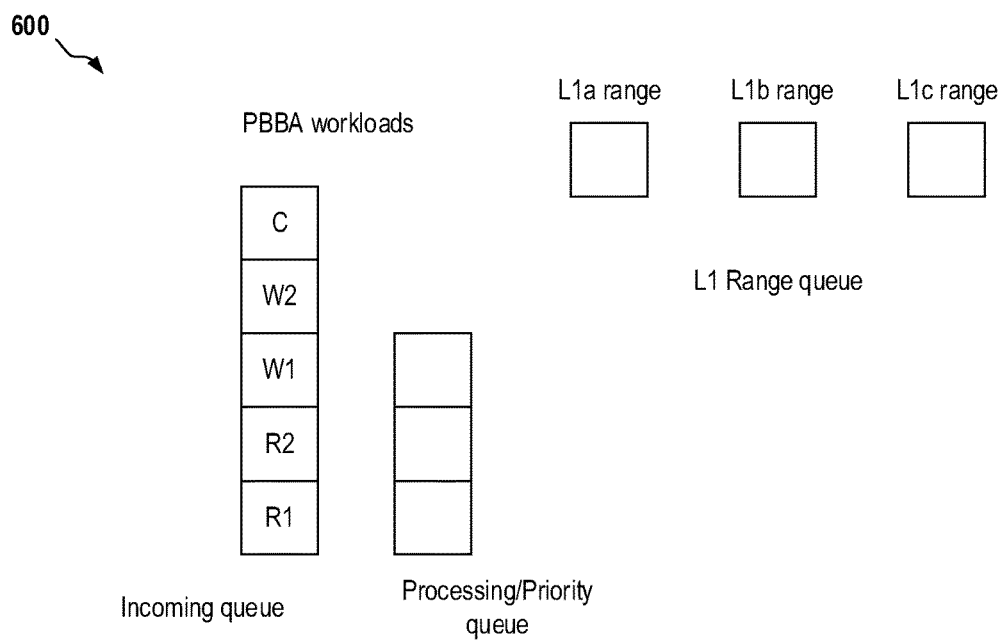
FIGS. 5a and 5b disclose aspects of example read/write queues and processing queues.
Figure 5B:
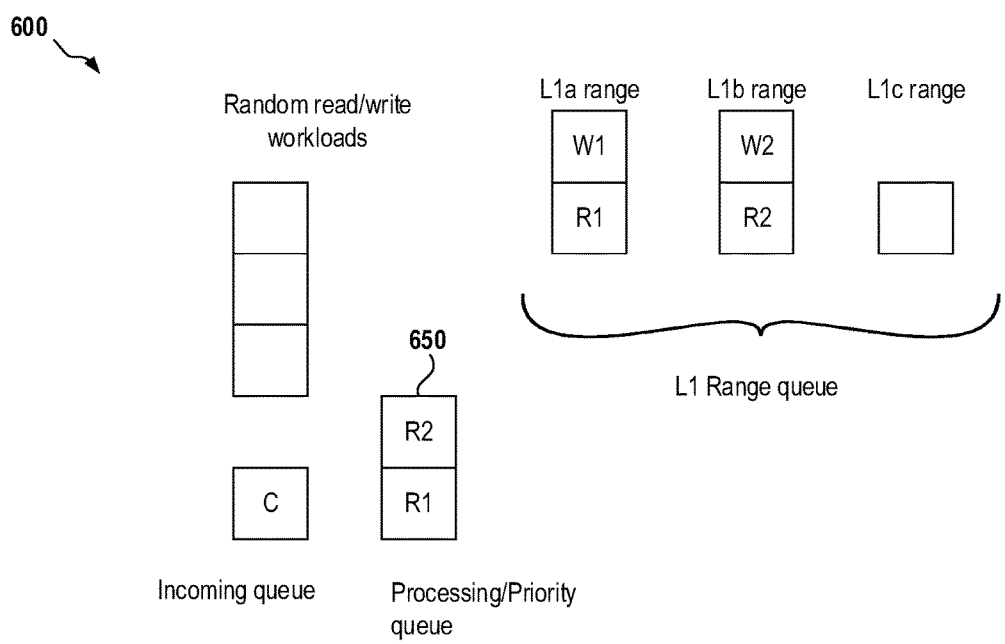

With reference now to FIGS. 5a and 5b, some examples are provided to further illustrate some of the disclosed concepts. As disclosed in FIG. 5a, an incoming queue 600 is disclosed that includes a group of requests, namely, a first read request R1, a second read request R2, a first write request W1, a second write request W2, and a commit C. A sequence of requests may be referred to herein as a workload and, in the example case where a Purpose Built Backup Appliance (PBBA) will perform the requested work, the workload may be referred to as a PBBA workload. In general, sequential I/Os are processed in the indicated sequence, beginning with the first read request R1. Since these I/O requests are sequential, the overhead that would be imposed by the use of a tree for random I/O requests is avoided, and there is no need to employ a priority queue, so there will be no performance regression.

In the example of FIG. 5a, the I/O requests W1 and R1 both require loading of the metadata in the same range, that is, $L_1(a)$, and so must be processed in the order shown in the incoming queue 600. Similarly, the I/O requests W2 and R2 both require loading of the metadata in the range $L_1(b)$. In general, the requests of the incoming queue are each added to a pending metadata load queue. These metadata load queues thus identify the requests, or jobs, that require the metadata of a particular range to be loaded in order to service that job. Thus, depending on the nature of the requests in the incoming queue 600, a metadata load queue for a particular range can include both read and write requests, only read requests, or only write requests.

In this particular example, the R1 request from the incoming queue 600 would be processed first since it is first in the incoming queue 600. Because R1 needs the metadata of the $L_1(a)$ segment to be loaded in order to service R1, R1 is added to the $L_1(a)$ range pending load queue, as shown in FIG. 5b. The read request R2 is processed next. Because R2 of the incoming queue 600 needs the metadata of the $L_1(b)$ segment to be loaded in order to service R2, R2 is added to the $L_1(b)$ range pending load queue, as also shown in FIG. 5b. The write requests W1 and W2 of the incoming queue 600 are similarly processed, such that W1 is added to the $L_1(a)$ range pending load queue, and W2 is added to the $L_1(a)$ range pending load queue.

The pending load queues are complete once the various requests of the incoming queue 600 have been assigned to a corresponding pending load queue of a range that corresponds to the request. The metadata of each range that has a pending load queue of one or more jobs can then be loaded in preparation for performance of the read and write requests. For example, once the pending metadata load is completed for the range $L_1(a)$, the read request R1 is then en-queued to the processing/priority queue 650. Next, and similarly, once the pending metadata load is completed for the range $L_1(b)$, the read request R2 is then en-queued to the processing/priority queue 650 behind the R1 request, as shown in FIG. 5b. Next, write request W1 would be added to the processing queue 650 by read request R1 at the completion of R1, since R1 precedes W1 in the incoming queue 600. In a similar fashion, the write request W2 would be enqueued to the processing queue by read request R2 at the completion of R2, since R2 precedes W2 in the incoming queue 600. Finally, the commit request C would wait for all the pending read and write requests to complete and would be processed in the incoming queue 600.

As the foregoing example demonstrates, the processing/priority queue 650 maintains consistency, in terms of the order of the requested read/write processes, with the order of the requested random read/write processes of the incoming queue 600, as shown in FIG. 5b. It should be noted that because W1/R1 require a different metadata range than R2/W2, W1/R1 can be processed by the processing/priority queue 650 at the same time as R2/W2.

E. Aspects of Example Methods

Figure 6:
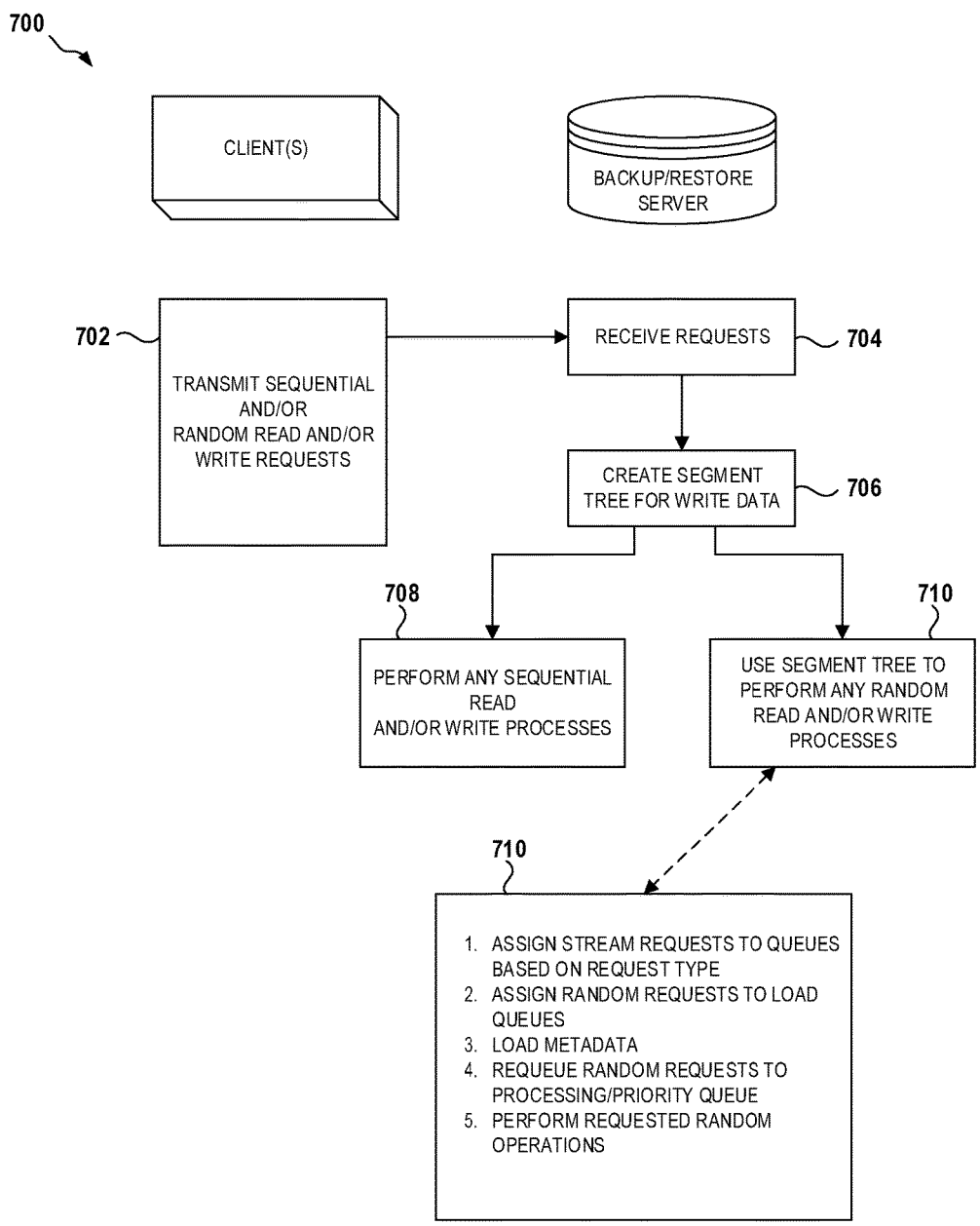
FIG. 6 discloses aspects of an example process according to one or more embodiments of the invention.

With reference once again to FIGS. 1-5b, and directing attention now to FIG. 6 as well, details are provided concerning an example method 700. The example method 700 can begin at 702 when a client transmits sequential and/or random read and/or write requests to a backup and restore server. The read requests may be transmitted as part of a restoration process, and write requests may be transmitted as part of a backup process. The requests transmitted by the client are then received 704 by the backup and restore server. In general, one or more requests that concern a specific data grouping, such as a file for example, collectively constitute a stream.

In the case where a write request is received 704 from a client, the process 700 may involve creating a segment tree 706 for write data. As well, a segment tree may be opened/created 706 for overwrite data. In some embodiments, the segment tree may only be employed in connection with random read and write requests. Where a stream includes sequential read and/or write processes, those sequential processes can be performed 708 without resort to the segment tree. On the other hand, when the stream additionally includes random read and/or write requests, those random requests can be serviced concurrently 710 with the sequential requests since the random requests may require use of the segment tree, but the sequential requests do not. As well, where random requests require the use of different respective metadata ranges, those random requests can be handled concurrently with each other. Otherwise, those random requests can be handled serially with respect to each other. It should also be noted that prefetching of metadata can be performed for sequential reads since it is known what metadata will be needed next and the data and metadata are already loaded in the cache, and the use of prefetching will contribute to a reduction in latency.

In more detail, the process 710 may involve splitting the requests of a stream into multiple queues, such as an incoming queue for sequential requests, and a processing/priority queue for random requests. Next, the random requests can be assigned to a respective load queue of a metadata range until all of the random requests have been assigned.

Once the random requests have been assigned to metadata ranges, the metadata of those ranges can be loaded for use in performance of the random requests. The random requests can then be re-queued to the processing/priority queue and the requested random operations then performed in the same order that the random requests were initially received. Finally, the random requested operations can be performed 710 concurrently with performance 708 of the sequential operations.

F. Example Illustrative Results

Figure 7A:
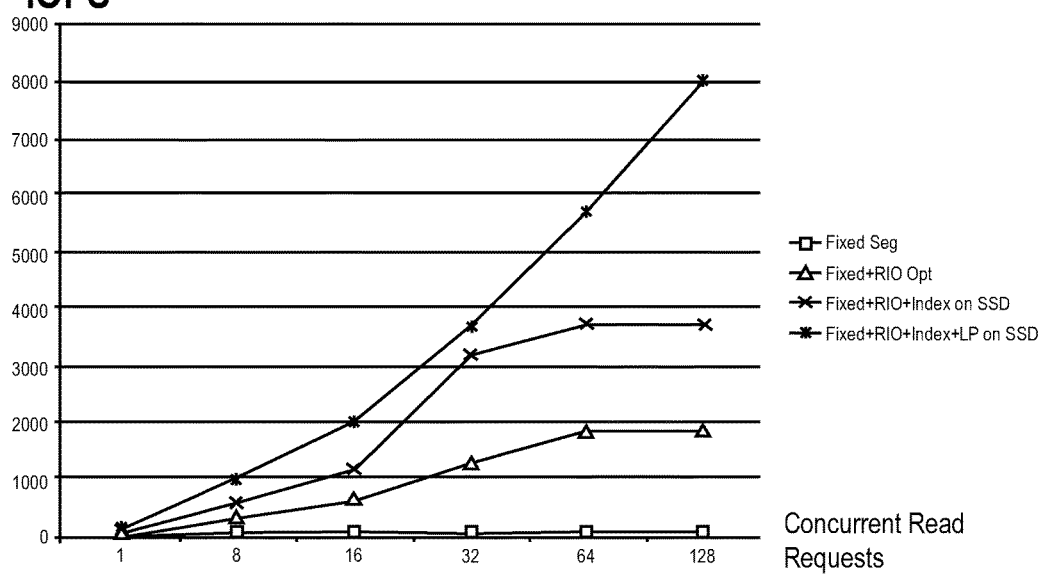
FIGS. 7a and 7b disclose results of implementation of an example embodiment, expressed in terms of input/output operations carried out per second (IOPS) and latency, respectively.
Figure 7B:
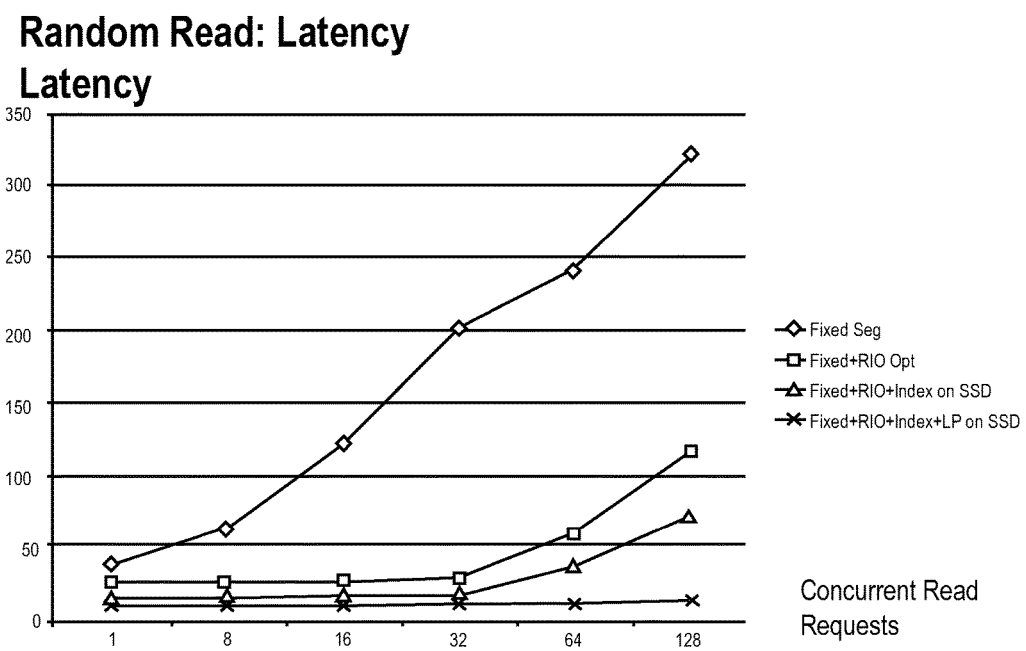

Directing attention now to FIGS. 7a and 7b, some illustrative results achieved by example embodiments of the invention are provided. In terms of test parameters, the testing was performed in connection with Data Domain DD860 platform using 6 shelves (8400 disk IOPS) on a single stream with 128 concurrent I/O requests. Without the use of an embodiment of the invention, the maximum IOPS that could be achieved on 1 stream with random read/writes was around 100 IOPS. The system was able to get 1/8th of the actual disk I/O available and the maximum latency was around 300 ms.

In contrast, where methods and processes of the invention were employed, the user IOPS increased to 1700 IOPS, and the I/O latency reduced to 120 ms. Further, with index on SSD and caching L1 segments on SSD for faster access, the test system achieved 8000 IOPS with maximum I/O latency of 50 ms. Thus, the techniques of the present invention pushed a DDFS to achieve higher IOPS (6× more) and reduced the latency by more than 2.5 times. With SSD caching for index and metadata segments using the parallel I/O processing of sequential and random requests, the system was able to provide user I/Os close to disk I/Os.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving a stream that identifies I/O operations requested to be performed with respect to a data grouping;
    identifying, in the stream, random I/O requests and sequential I/O requests;
    queuing the sequential I/O requests in a priority/processing queue and processing the sequential I/O requests immediately without waiting for loading of any metadata;
    defining a metadata load queue by assigning each of the random I/O requests to a respective range of metadata;
    loading the metadata of each range;

re-queuing the random I/O requests;
using the loaded metadata, performing a random I/O operation that corresponds to one of the random I/O requests; and
performing the random I/O operation and a sequential I/O operation concurrently with each other.

2. The method as recited in claim 1, wherein each metadata range corresponds to a respective set of one or more data segments.

3. The method as recited in claim 1, wherein the metadata and the data segments are stored in different respective types of storage.

4. The method as recited in claim 1, wherein the random I/O requests are re-queued in the priority/processing queue in the same order, relative to each other, in which they were initially received as part of the stream.

5. The method as recited in claim 1, wherein metadata included in the metadata ranges comprises part of a metadata tree that represents the data grouping.

6. The method as recited in claim 1, further comprising creating a metadata tree that represents the data grouping, the metadata tree including data segments of the data grouping and also including metadata embraced by the metadata ranges.

7. The method as recited in claim 1, further comprising creating a unique reference for each data segment in the data grouping, wherein the unique references collectively comprise the metadata.

8. The method as recited in claim 1, wherein the requested I/O operations comprise a backup operation and/or a restore operation.

9. The method as recited in claim 1, wherein the requested I/O operations include a backup operation, and data deduplication is performed as part of that backup operation.

10. The method as recited in claim 1, further comprising caching the metadata to SSD.

11. A non-transitory storage medium having stored therein computer-executable instructions which, when executed by one or more hardware processors, perform the following:
receiving a stream that identifies I/O operations requested to be performed with respect to a data grouping;
identifying, in the stream, random I/O requests and sequential I/O requests;
queuing the sequential I/O requests in a priority/processing queue and processing the sequential I/O requests immediately without waiting for loading of any metadata;
defining a metadata load queue by assigning each of the random I/O requests to a respective range of metadata;
loading the metadata of each range;
re-queuing the random I/O requests;
using the loaded metadata, performing a random I/O operation that corresponds to one of the random I/O requests; and
performing the random I/O operation and a sequential I/O operation concurrently with each other.

12. The non-transitory storage medium as recited in claim 11, wherein each metadata range corresponds to a respective set of one or more data segments.

13. The non-transitory storage medium as recited in claim 11, wherein the metadata and the data segments are stored in different respective types of storage.

14. The non-transitory storage medium as recited in claim 11, wherein the random I/O requests are re-queued in the priority/processing queue in the same order, relative to each other, in which they were initially received as part of the stream.

15. The non-transitory storage medium as recited in claim 11, wherein metadata included in the metadata ranges comprises part of a metadata tree that represents the data grouping.

16. The non-transitory storage medium as recited in claim 11, wherein the processes further comprise creating a metadata tree that represents the data grouping, the metadata tree including data segments of the data grouping and also including metadata embraced by the metadata ranges.

17. The non-transitory storage medium as recited in claim 11, wherein the processes further comprise creating a unique reference for each data segment in the data grouping, wherein the unique references collectively comprise the metadata.

18. The non-transitory storage medium as recited in claim 11, wherein the requested I/O operations include a backup operation, and data deduplication is performed as part of that backup operation.

19. The non-transitory storage medium as recited in claim 11, wherein the processes further comprise caching the metadata to SSD.

20. A physical device, wherein the physical device comprises:
one or more hardware processors; and
the non-transitory storage medium as recited in claim 11.

* * * * *